United States Patent
Lehr et al.

(10) Patent No.: US 7,604,035 B2
(45) Date of Patent: Oct. 20, 2009

(54) APPARATUS FOR MOUNTING A TIRE ON A VEHICLE WHEEL RIM

(75) Inventors: Werner Lehr, Modautal (DE); Andreas Peinelt, Pfungstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 11/980,069

(22) Filed: Oct. 29, 2007

(65) Prior Publication Data

US 2008/0128092 A1   Jun. 5, 2008

(30) Foreign Application Priority Data

Oct. 28, 2006   (DE) .................. 10 2006 050 968

(51) Int. Cl.
*B60C 25/135*   (2006.01)
(52) U.S. Cl. .................. 157/1.17; 157/1.22; 157/16
(58) Field of Classification Search ............. 157/1.17, 157/1.1, 1.2, 1, 1.22–1.28, 14, 16
See application file for complete search history.

(56) References Cited

U.S. PATENT DOCUMENTS

| | | | | |
|---|---|---|---|---|
| 4,830,079 A | * | 5/1989 | Onuma ................ | 157/1.24 |
| 5,222,538 A | * | 6/1993 | Tomita et al. ............ | 157/1 |
| 6,076,586 A | | 6/2000 | Hans | |
| 6,463,982 B1 | * | 10/2002 | Doan ..................... | 157/1.1 |
| 6,615,649 B1 | * | 9/2003 | Kokubu et al. ........... | 157/1.17 |
| 7,201,203 B2 | | 4/2007 | Rogalla et al. | |
| 2008/0047670 A1 | * | 2/2008 | Giacona et al. .......... | 157/1.17 |
| 2008/0128091 A1 | * | 6/2008 | Nomura .................. | 157/1.17 |

FOREIGN PATENT DOCUMENTS

| | | |
|---|---|---|
| DE | 196 00 323 | 7/1997 |
| DE | 102 22 164 | 10/2003 |
| DE | 102 56 870 | 6/2004 |

* cited by examiner

*Primary Examiner*—Hadi Shakeri
(74) *Attorney, Agent, or Firm*—W. F. Fasse; W. G. Fasse (57) ABSTRACT

A tire mounting apparatus includes a mounting head that is rotated by a drive shaft and slidably carries two adjusting plates. A push rod extends coaxially through the drive shaft, and a deflecting rod slopes laterally from the push rod through openings in the plates. The deflecting rod has two sloping actuating surfaces with different slope angles that engage in the openings of the plates to cause different sliding displacement of each plate by an axial actuation of the push rod. A bead deflector and a pressing roller are respectively mounted on the plates so they can be adjusted to different wheel rim diameters. A toggle lever and/or a pivot joint adjust a pivot angle of at least one of the tire mounting tools to remain tangential to the wheel rim circumference while it is slidingly adjusted to a different wheel diameter.

12 Claims, 2 Drawing Sheets

APPARATUS FOR MOUNTING A TIRE ON A VEHICLE WHEEL RIM

PRIORITY CLAIM

This application is based on and claims the priority under 35 U.S.C. §119 of German Patent Application 10 2006 050 968.4, filed on Oct. 28, 2006, the entire disclosure of which is incorporated herein by reference.

FIELD OF THE INVENTION

The invention relates to an apparatus for mounting a tire on a wheel rim of a vehicle.

BACKGROUND INFORMATION

At the present time, automatic tire mounting equipment is often used for the industrial or commercial mounting of tires on wheel rims or disk wheels for vehicles. It is known to make the tire mounting apparatuses adjustable so that various different wheel rim or disk types and sizes can be accommodated, i.e. can have tires mounted thereon in succession one after another. In that regard, different types or sizes of tires with different profile ratios of about 65% to 25% are mounted on such different wheel rim types. For that purpose, an adjusting arrangement may be provided on the tire mounting head of the tire mounting apparatus, with which the tire mounting tools of the tire mounting head can be automatically adjusted to different wheel rim or disc types with different widths and diameters. Particular difficulties in this automatic adjustment are caused by the large range of different wheel rim or disk diameters from 12 inches to 25 inches for present typical wheel rims. While carrying out this adjustment to accommodate such a large range of wheel sizes, the tire mounting tools must be radially adjusted in different radial directions to achieve the appropriate tool positions relative to the wheel for all possible wheel sizes.

A tire mounting apparatus of the above mentioned type with an automatic adjusting arrangement is known from the German Patent DE 102 22 164 C1. This tire mounting apparatus comprises a wheel rim holding or clamping arrangement on which a provided wheel rim or disk is supported and clampingly held in a horizontal orientation. A rotatably driven mounting head is arranged above the wheel rim or disk. Tire mounting tools including a tire bead deflector, a tire sidewall pressing roller, and a tire sidewall hold-down member are secured on the mounting head. In that regard, the bead deflector and the pressing roller are arranged at a small spacing distance from one another on a common horizontal support arm, by which the tools are positionable on two different circular paths about the rotation axis or wheel axis, and are individually adjustable in the axial or vertical direction by two spindle drives. The support arm in its entirety is adjustable in common to certain radii about the wheel axis by a separate radial spindle drive, so that the mounting apparatus can be adjusted to permit it to automatically mount, in succession after one another, different tires with different diameters and profile ratios onto wheel rims or disks with different widths and wheel diameters.

In that known apparatus, because the bead deflector and the pressing roller are horizontally rigidly connected with one another by the support arm, the bead deflector finger and the pressing roller that rolls or runs tangentially along the tire sidewall are essentially only exactly adjustable to a single predetermined tire and rim size, due to the changing tangential angles of these mounting tools that vary along with the varying working position diameter. In other words, as the mounting tools are adjusted to a different working diameter, the tangential angle setting of the tools relative to the circumferential path around the tire sidewall changes. Namely, at large deviations from the tire or wheel rim size that is predetermined for an exact tangential positioning, e.g. for very large or very small wheel sizes deviating from the nominal or average size, the pressing roller will no longer lie exactly tangentially on the tire sidewall and/or the bead deflector shoe will be positioned with a disadvantageous angular position relative to the inner wall of the tire bead or to the outer edge of the wheel rim flange. This can lead to problems in the tire mounting operation, or can lead to damage of the tire sidewall or bead edge, especially at the extreme ends of large adjustment ranges or when mounting extremely low profile tires. Thus, such a tire mounting machine can only be used for mounting a limited range of different tire and wheel rim sizes. Present typical wheels for passenger automobiles are provided in a wheel rim or disk diameter range from 12 inches to 25 inches, which is too large a range to be accommodated by the known conventional tire mounting machines. Namely, with such a tire mounting machine, it is not possible to successively mount tires covering the entire tire size spectrum without problems and without carrying out manual adjustments for switching tire sizes.

SUMMARY OF THE INVENTION

In view of the above, it is an object of the invention to provide a tire mounting apparatus that is improved in such a manner that vehicle tires spanning a large range of different inner diameters and different profile ratios can be mounted surely, reliably and without problems onto wheel rims of corresponding sizes, without requiring manual adjustment processes. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an apparatus for mounting a tire on a vehicle wheel rim. The tire mounting apparatus cooperates with a wheel rim holding apparatus according to any conventional teachings, and comprises a tire mounting head connected with a rotationally driven drive shaft. Tire mounting tools including a tire bead deflector and a tire pressing roller and optionally also a following roller, as well as an adjusting arrangement, are provided on the mounting head. The adjusting arrangement serves to adjust at least the bead deflector and the pressing roller to proper working radii about the rotation axis of the drive shaft as properly adjusted for the tire diameter of the tire being mounted. The adjusting arrangement comprises mechanical radial adjusting devices that are respectively separately connected with the bead deflector and the pressing roller, and are arranged and embodied so that they slidingly displace and adjust the bead deflector and the pressing roller horizontally and radially or in a longitudinal sliding direction by approximately the same radial amount relative to the rotation axis while maintaining substantially the same prescribed tangential positions of these mounting tools.

The invention has the advantage that the adjusting arrangement is able to achieve a radial sliding displacement and adjustment of all mounting tools while maintaining a proper angular or tangential positioning of the tools relative to the tire, for nearly all possible tire sizes. Namely, the tire mounting machine can mount tires of nearly all existing passenger vehicle tire sizes onto nearly all associated wheel rim sizes and types with a diameter ranging from 12 inches to 25 inches, without requiring manual adjustment, rearrangement, or re-equipping of the mounting tools or other components of the apparatus, so that the tires of different sizes or types can be mounted successively one after another in a fully automated manner. In that regard, the exact radial adjustment of the tire mounting tools with further consideration of maintaining the prescribed tangential angle of the mounting tools simultaneously has the advantage that all tire types including those with extreme low profile ratios down to 25% can be mounted without problems.

Furthermore, the mechanical adjusting devices are preferably arranged within the rotatable tire mounting head. This achieves the advantage that no rotatable electrical cable connections for adjustment motors and no rotatable pressure line connections for hydraulic oil or pneumatic compressed air drives are necessary. Avoiding such rotatable connections is advantageous, because such connections tend to be prone to trouble and failure due to the continuous rotational motion of the mounting head while carrying out the tire mounting operation.

In a particular example embodiment of the inventive apparatus, the adjusting arrangement includes a push rod or thrust rod guidedly arranged axially through the drive shaft, and the adjusting devices are driven for adjustment by the push rod. This embodiment has the advantage that with a simple vertical motion of the push rod, which is independent of and unaffected by the rotation of the tire mounting head, it is possible to radially and tangentially adjust, independently of one another, at least two different tire mounting tools having different angular positions.

A further particular example embodiment of the inventive apparatus involves an adjusting arrangement comprising adjusting plates that are slidingly displaceable separately and differently relative to one another. A deflecting or redirecting element preferably embodied as a deflecting rod is connected to the vertical or axial push rod, so as to redirect and deflect the vertical actuation motion of the push rod into a horizontal sliding displacement motion of the adjusting plates. This has the advantage that thereby a longitudinal sliding displacement of the adjusting plates can serve to radially slidingly adjust two or three tire mounting tools with proper tangential angles thereof through radial sliding adjustment motions, so as to adjust and fit the mounting tools to a large range of different wheel rim or disc diameters. Further preferably, the deflecting rod is configured with at least two differently sloping actuating surfaces having two different slope angles that respectively individually act on and actuate the two separate slidable adjusting plates. Thus, the two differently sloping actuating surfaces cause two different sliding displacements of the two separate slidable adjusting plates in the horizontal radial direction. As a result, the respective tire mounting tools carried by or connected to these adjusting plates simultaneously are separately adjusted as necessary in an advantageous manner to always match the diameter of the tire being mounted.

In a further example embodiment of the inventive apparatus, the adjusting arrangement further comprises tangential adjusting devices so that the tangential angular position of each tire mounting tool is also appropriately adjusted to maintain prescribed tangential angular positions of the tire mounting tools automatically following the radial adjustment thereof, to match various different wheel rim diameters. A jointed lever or toggle lever as a tangential adjusting device slides through the rotation axis along with the longitudinal sliding displacement of a tire mounting tool (e.g. the bead deflector) to which the lever is secured, so that at least the bead deflector always remains tangentially oriented relative to the tire sidewall bead or edge. If the apparatus further includes a following roller as another tire mounting tool, the following roller is advantageously connected via a pivot joint with the pressing roller, such that the following roller is also guided rotationally or pivotally to remain properly tangentially oriented by this tangential adjusting arrangement.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF A PREFERRED EXAMPLE EMBODIMENT AND BEST MODE OF THE INVENTION

Figure 1:
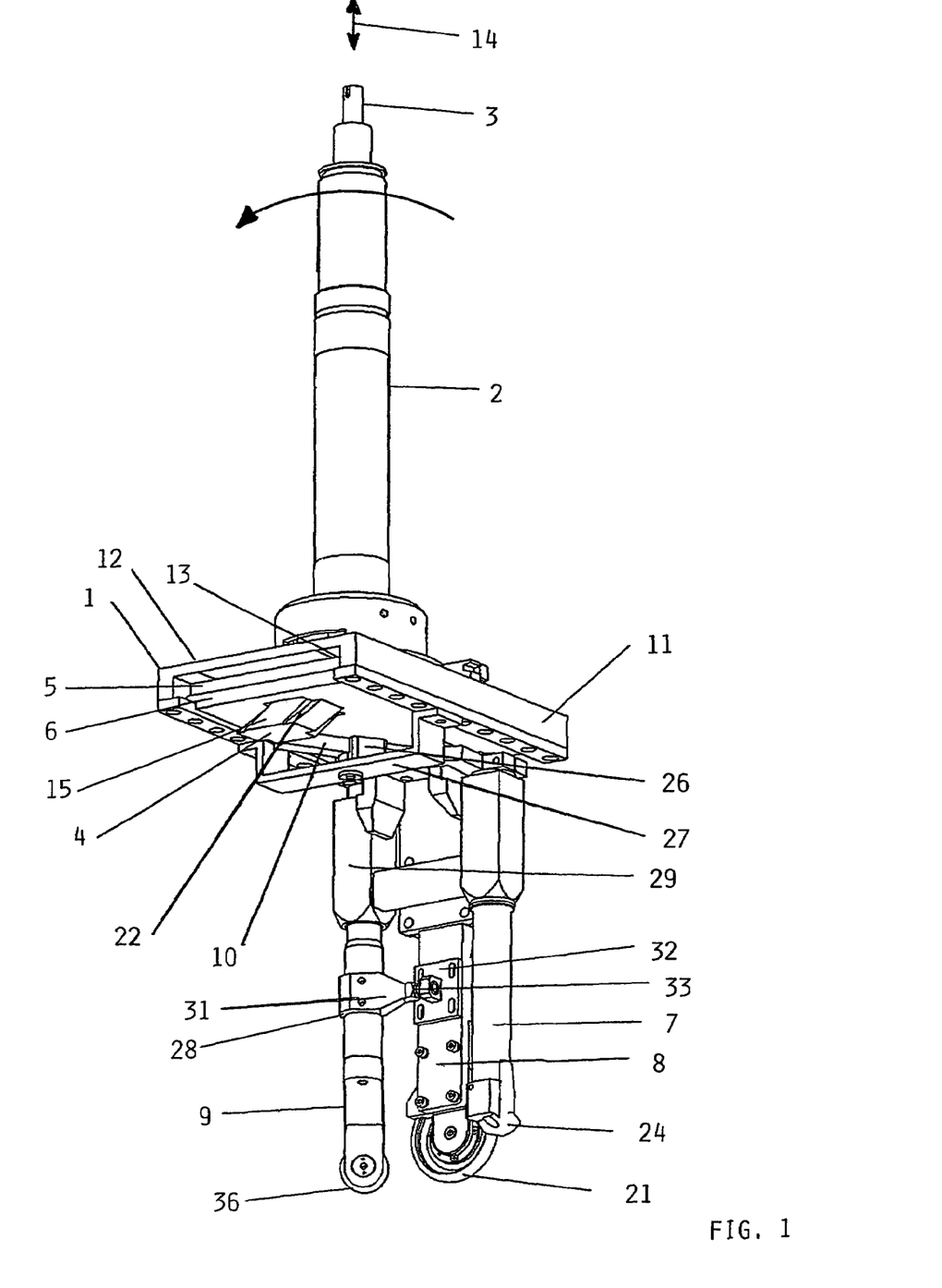
FIG. 1 is a perspective side view of a tire mounting apparatus according to the invention, including a mounting head, a drive shaft and three mounting tools.

FIG. 1 is a perspective view of a tire mounting apparatus or machine including a mounting head 1, a rotatable drive shaft 2, and three tire mounting tools 7, 8 and 9 arranged on and carried by the mounting head 1. Particularly, the tire mounting tools 7, 8 and 9 include a tire bead deflector 7, a tire sidewall pressing roller 8, and a following roller 9. The mounting head is secured to the drive shaft 2 and the drive shaft 2 is rotationally driven to rotate the mounting head 1 for carrying out a tire mounting process as will be described below. In this regard, the tire mounting apparatus cooperates with a wheel support and holding apparatus, which is not shown, but which clampingly holds and supports a wheel rim in a horizontal orientation.

The tire mounting apparatus further includes an adjusting arrangement comprising a thrust rod or push rod 3 that is slidably guided coaxially through a through-going axial bore in the drive shaft 2 along the rotation axis 20 of the mounting head 1. The thrust rod or push rod 3 is axially slidable up and down in the axial or vertical thrust directions 14. Furthermore, as an adjusting device, an obliquely sloping deflecting rod or redirecting rod 4 is secured to and extends laterally obliquely from a bottom end of the push rod 3. As will be described further below, the deflecting rod 4 has two differently sloping actuating surfaces, namely a main outer surface 15 and a secondary actuating surface provided by a sliding displacement groove 22. These two differently sloping actuating surfaces respectively individually actuate and horizontally slidingly displace two separate adjusting plates 5 and 6 that are slidingly carried and guided along guide slots 13 of a head plate 11, including a cover plate 12 and side plates. The bead deflector 7 and the following roller 9 are connected in a force-transmitting manner to, and supported by, the lower adjusting plate 6, and the pressing roller 8 is connected in a force-transmitting manner to, and supported by, the upper adjusting plate 5. The operation of these various components will be described further below.

The tire mounting apparatus serves for mounting a tire onto a wheel rim or disk. In addition to the components illustrated in FIG. 1, the overall tire mounting machine further includes a machine frame (not shown) that carries the illustrated tire mounting apparatus as well as the wheel rim holding apparatus (not shown) secured to the bottom of the machine frame.

Such a wheel rim holding apparatus is known from German Patent Laying-Open Document DE 102 56 870 A1, the disclosure of which is incorporated herein by reference.

For mounting a tire onto a wheel rim, the provided wheel rim is first horizontally laid onto a support surface of the wheel rim holding apparatus, and then tightly held or clamped in position thereon. Then a proper fitting tire is positioned on the wheel rim so that at least the lower tire bead lies slopingly in the wheel rim cavity or bed, and at least a part of the upper tire bead protrudes slopingly over the upper wheel rim flange. Then, the tire mounting head 1 supported above the wheel rim holding apparatus is lowered down, positioned and operated to press the upper tire bead over the upper wheel rim flange into the wheel rim bed or cavity. For that purpose, the tire mounting tools, i.e. the bead deflector 7, the pressing roller 8, and the following roller 9 are vertically adjusted and positioned corresponding to the wheel rim width, and are horizontally positioned corresponding to the wheel rim diameter. Then the tire mounting head 1 is rotated at least one time about its rotation axis 20 by rotation of the drive shaft 2, whereby the pressing roller 8 and the following roller 9 press the upper tire bead downwardly past the upper wheel rim flange into the wheel rim bed. Thereafter, the mounted tire can be inflated with pressurized air, either on the tire mounting apparatus itself, or in a further tire inflation apparatus with the aid of a tire filling bell.

In order that this tire mounting apparatus is able to automatically accommodate and mount essentially all typical motor vehicle tire sizes, and especially passenger automobile tire sizes, in succession one after another onto correspondingly sized wheel rims or disks, the tire mounting tools 7, 8 and 9 must be adjustable exactly to the various different tire and wheel rim types and sizes. For adjusting to the wheel rim width, the tire mounting head 1 in its entirety, and also the tire mounting tools 7, 8 and 9 vertically secured thereon partially also individually, are vertically movable and thus lowerable to the appropriate height for the respective wheel rim on which a tire is to be mounted. In that regard, the individual height positions or lowering values can be prescribed or specified by sensing the wheel rim type or the wheel rim dimensions. That can be carried out without particular problems according to any known disclosures of the prior art. The main problem of automatic adjustment relates to the various different wheel rim diameters that presently range from 12 inches to 25 inches for typical vehicle wheels, and the great diversity of extreme low profile ratios of 65% to 25% of tires to be mounted on the wheel rims. To be able to mount such a broad range of tires on such a broad range of wheels, previously it has typically been necessary to provide two different tire mounting apparatuses, whereby one apparatus was suitable for the smaller wheel rim diameters of e.g. 12 inches to 17 inches with larger profile ratios, and the other mounting apparatus was suitable for the larger wheel rim diameters of e.g. 18 to 25 inches with the smaller low profile ratios.

In contrast to the above, the inventive tire mounting head 1 is able to mount successively one after another all presently typical tire types and sizes on corresponding wheel rims or disks in an automatic manner without requiring manual adjustment procedures. Particularly, the present inventive apparatus is able to mount tires on wheels, covering the entire range of diameters from 12 inches to 25 inches, with fully automatic adjustment and adaptation of the apparatus to each wheel size. For that purpose, the tire mounting head 1 basically comprises a novel adjusting arrangement by means of which at least both the bead deflector 7 as well as the pressing roller 8 are adjustable with suitable lateral longitudinal adjustment distances relative to the rotation axis 20 while also considering and especially substantially maintaining a proper prescribed tangential orientation adjustment of both the bead deflector 7 and the pressing roller 8.

As mentioned above, the mounting head 1 is arranged and supported vertically hanging in a non-illustrated machine frame, to which the mounting head 1 is secured at the top via the drive shaft 2. The head plate 11 extends horizontally at a right angle to, and is rigidly connected with, the bottom end of the drive shaft 2. The head plate 11 at the top comprises the right angled cover plate 12 with the lateral guide slots 13 in which the two slidable adjusting plates 5 and 6 are fitted and slidingly guided. The adjusting plates 5 and 6 are thus mechanical radial or lateral longitudinal adjusting devices as a part of the adjusting arrangement. In that regard, the adjusting plates lie slidingly parallel on top of one another, whereby the upper adjusting plate 5 serves for the radial adjustment of the pressing roller 8 while the lower adjusting plate 6 serves for the radial adjustment of the bead defector 7 and the following roller 9.

For actuating the radial or lateral sliding adjustment of the adjusting plates 5 and 6, a deflecting rod 4 is secured at the lower end of the push rod 3 in the area of the cover plate 12. The deflecting rod 4 has an approximately rectangular cross-section with additional grooves, as will be described below. The deflecting rod 4 is arranged laterally to one side and extending obliquely or sloping at an angle from the push rod 3. The deflecting rod 4 is also a mechanical adjusting device forming a part of the adjusting arrangement. In that regard, the deflecting rod 4 has an actuating surface represented by the main outer surface 15 that slopes at a slope angle of preferably 45° relative to the push rod 3 or the rotation axis 20 of the mounting head 1. The deflecting rod 4 and particularly the sloping actuating surfaces thereof are oriented in a longitudinal direction 35 of the adjusting plates 5 and 6. Thereby, this achieves a deflection of the vertical actuating motion of the push rod 3 into a horizontal actuating motion of the adjusting plates 5 and 6, so that this represents a 90° deflection or redirection of the actuation motion. For this purpose, each adjusting plate 5 and 6 respectively has an opening 37 such as a recess, slot, channel, hole or the like, and the deflection rod 4 is fitted with a slide bearing into the opening 37 of each adjusting plate 5 and 6. The opening 37 of each slide plate 5 and 6 is respectively appropriately configured to cooperate and interact with the deflecting rod 4 as follows.

Preferably, the deflecting rod 4 has two differently sloping actuating surfaces, namely represented by the main outer surface 15 and the secondary actuating surface of a sliding displacement groove 22. The opening 37 in the upper adjusting plate 5 is configured to cooperate with the sloping main outer surfaces 15 of the deflecting rod 4 in a sliding manner, so that as the deflecting rod 4 moves up and down along with the push rod 3, the sloping main outer surface 15 of the deflecting rod 4 acts against the cooperating counter surface of the opening 37 of the upper adjusting plate 5 so as to horizontally slidingly displace the adjusting plate 5 in a stepless manner radially in both longitudinal directions 35 in accordance with the upward or downward motion of the push rod 3. On the other hand, the lower adjusting plate 6 has its opening 37 configured to cooperate with the sloping actuating surfaces of the sliding displacement grooves 22, which slope at a different slope angle (and particularly a less steep angle) than the main outer surface 15. Thus, as the deflecting rod 4 moves up and down with the push rod 3, the lower adjusting plate 6 will be radially slidingly displaced to a different (e.g. greater) extent than the upper adjusting plate 5. It should be further understood that the opening 37 in the upper adjusting plate 5 is configured so as not to engage or cooperate with the actuating surfaces of the sliding displacement grooves 22, while the opening 37 of the lower adjusting plate 6 is configured so as not to engage or cooperate with the main outer surfaces 15 of the deflecting rod 4.

Figure 2:
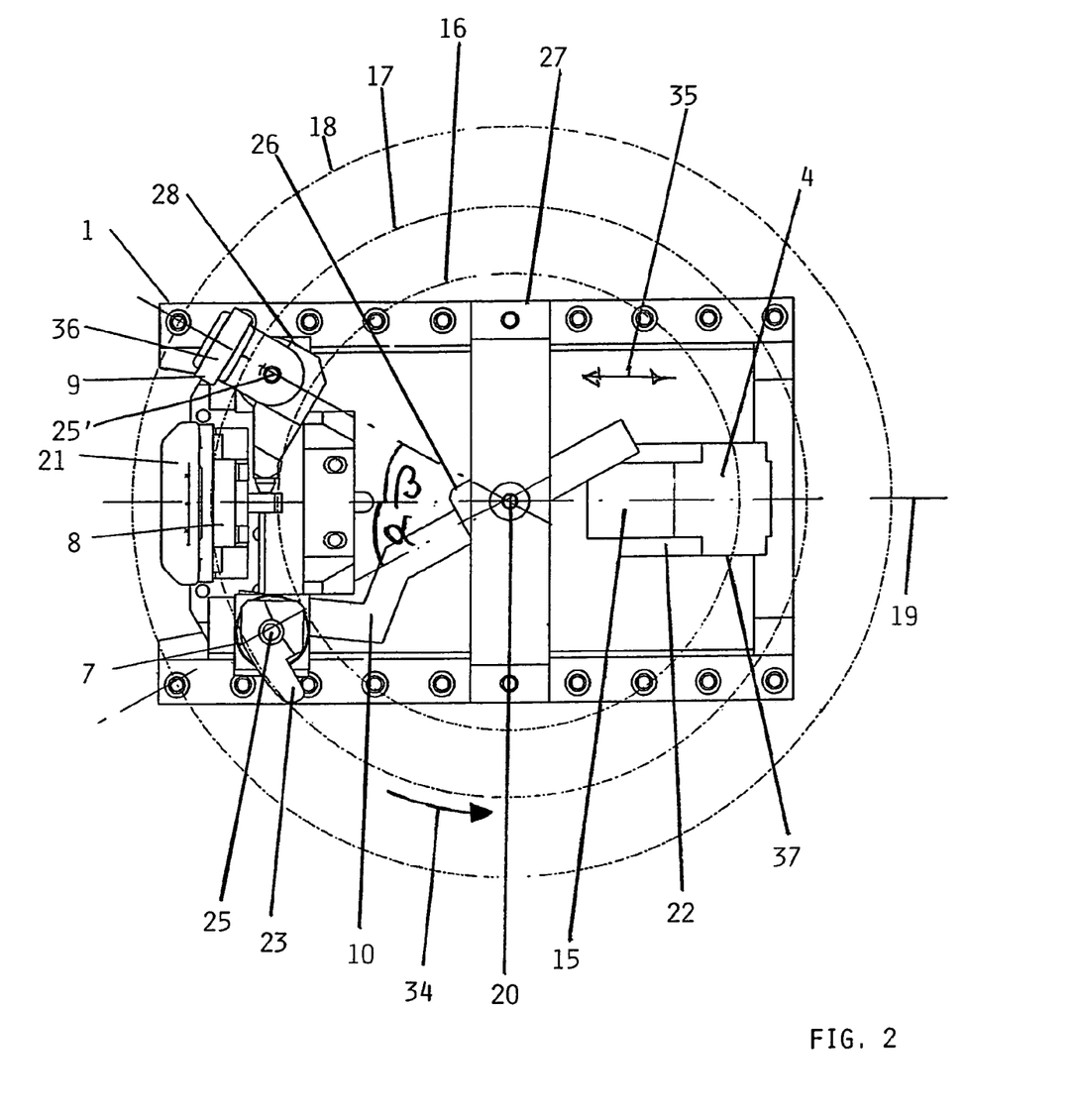
FIG. 2 is a bottom plan view of the mounting tools carried by the mounting head.

The arrangement of the adjusting arrangement with its adjusting devices 3, 4, 5 and 6, and the arrangement of the tire mounting tools 7, 8 and 9, are illustrated in further detail in FIG. 2.

FIG. 2 further shows three exemplary different wheel rim diameters illustrated schematically simply as circles having different diameters. Thereby the inner circle 16 schematically represents a small wheel rim, the middle circle 17 schematically represents a middle sized wheel rim, and the outer circle 18 schematically represents a large wheel rim, to which the tire mounting apparatus is adjustable in a continuous step-less manner. In the illustrated example embodiment, the tire mounting apparatus is adjusted to the radial adjustment or mounting position for the middle sized wheel rim 17 having a diameter of e.g. 17 inches.

For the proper adjustment of the tire mounting tools, these need to be adjusted not only to the proper radial position, but also to maintain the proper angular, i.e. tangential, position or relationship relative to the tire and wheel rim being processed. Due to the arrangement of the pressing roller 8 at a right angle to the diameter line 19, which simultaneously runs along the longitudinal direction 35 of the adjusting plates 5 and 6, the pressing roller 8 merely needs to be radially adjusted because the pressing roller 8 will always remain tangentially oriented on the tire sidewall independent of its radial adjustment distance relative to the rotation axis 20. In other words, as the pressing roller 8 is radially displaced along the diameter line 19, the pressing roller wheel 21 of the pressing roller 8 always remains oriented perpendicular to this diameter line 19 and thus tangential to the tire sidewall bead edge. That is because the diameter line always extends through the rotation axis 20 and simultaneously corresponds to the sliding displacement direction 35 of the adjusting plates 5 and 6 and particularly the adjusting plate 5 that carries the pressing roller 8 and radially adjusts the position of the pressing roller 8 controlled by the vertical displacement of the push rod 3.

A proper tangential orientation of the pressing roller 8 is especially important for mounting tires having an extreme low profile ratio of 25% to 45%. Namely, for such tires the pressing roller 8 must always contact and roll precisely along the very narrow and stiff tire sidewall in order to be able to press the narrow tire sidewall past the wheel rim flange into the wheel rim bed without damaging the wheel rim. Thus, due to the tires with a very low profile ratio, therefore the pressing roller 8 must always be positioned to contact onto the tire sidewall very close to the wheel rim flange edge, so that a very small spacing distance of only about 4 mm is provided between the pressing roller 8 and the outer edge of the wheel rim flange. Therefore it is a preferred feature of the invention that the sliding displacement of the pressing roller 8 for adjusting to a different tire or wheel rim size is carried out along the diameter line 19 passing through the rotation axis 20, because thereby it is automatically ensured that the pressing roller wheel 21 of the pressing roller 8 will always be oriented tangentially so as to roll exactly tangentially around the tire sidewall close to the bead edge thereof. Because the sliding displacement of the pressing roller 8 thereby is always exactly radial, i.e. along a diameter line through the rotation point 20, the sliding displacement distance thereof always corresponds to the radial spacing distance between the previously handled wheel rim, e.g. wheel rim 16, and the present wheel rim size to be handled, e.g. the wheel rim 17.

As seen in the rotation direction 34 of the tire mounting head 1 during the tire mounting operation, the bead deflector 7 is arranged before or ahead of the pressing roller 8, and the following roller 9 is arranged behind or after the pressing roller 8, respectively at symmetrical angular positions α and β relative to the circumferential position of the pressing roller 8. For example, at a middle wheel rim size 17, the angular positions or spacings α and β of the bead deflector 7 and of the following roller 9 each amount to about 30° relative to the diameter line 19 passing essentially through the pressing roller 8, about the rotation axis 20, so that an exact, sure and reliable tire mounting process is still ensured even for extremely low profile ratio tires. For adjusting the apparatus to a different tire or wheel rim size, both the bead deflector 7 as well as the following roller 9 are slidingly displaced to the new provided radial mounting position by only the single lower adjusting plate 6, due to the symmetrical arrangement of the bead deflector 7 and the following roller 9 relative to the pressing roller 8. In other words, due to the symmetrical arrangement of the bead deflector 7 and the following roller 9, both of these can be adjusted longitudinally by a single common adjusting plate 6. However, for an axial sliding displacement in both longitudinal directions 35 of the lower adjusting plate 6, it must be considered, due to the angle function of the angular position of the bead deflector 7 and the following roller 9 diverging from the longitudinal direction 35, that the bead deflector 7 and the following roller 9 must be slidingly displaced along a different displacement path distance than the radial displacement of the pressing roller 8, relative to the rotation axis 20 along the diameter line 19. As will be explained further below, this difference of the sliding displacement relates to the sliding displacement in the longitudinal sliding directions 35 of the adjusting plates, and does not refer to the actual radial position of the mounting tools 7, 8 and 9 from the rotation axis 20 which must remain consistent. This angle-dependent different sliding path distance changes respectively by about 10 mm for large 25 inch diameter wheels or small 12 inch diameter wheels relative to the medium wheel diameter of e.g. 17 inches.

As will be explained below, the inventive adjusting arrangement provides for the required different sliding displacement for actuating the bead deflector 7 and the following roller 9 relative to the pressing roller 8. Without the inventive adjusting arrangement, the improper sliding adjustment of the respective tools could lead to contact of any one or more of the tools with the wheel rim or disk, or to operating interference during the tire mounting process, especially when trying to accommodate large adjustment ranges. For an exact adjustment to various different wheel rim diameters 16, 17, and 18, the tire mounting tools 7, 8 and 9 must all be adjusted by the same radial displacement distance relative to the rotation axis 20. This is especially true to be able to mount tires with extreme low profile ratios on wheel rims of considerably differing diameters. Thus, for such a tire mounting apparatus according to the invention it must be ensured that the spacing distance of the bead deflector 7, the pressing roller 8 and the following roller 9 always comprises the same radial spacing distance relative to the wheel rim flange edge after carrying out the proper adjustment, for all wheel or tire sizes to be mounted. Otherwise, with a different sliding displacement along a radial path of the individual tools 7, 8 and 9 relative to the rotation axis 20, the bead deflector 7 and the following roller 9 would damage the wheel rim edge and/or the pressing roller 8 would run along a path radially outside of the tire sidewall at least for extreme low profile ratio tires.

The abovementioned sliding displacement differences of the longitudinal sliding displacement in an angular direction are taken into account by the invention by providing a different sliding displacement for the lower adjusting plate 6 in comparison to the upper adjusting plate 5 as mentioned above. This is achieved according to the invention by providing the additional sliding displacement groove 22 with the secondary sloping actuating surfaces on the side areas of the deflecting rod 4, whereby the secondary actuating surfaces of the sliding displacement groove 22 have a different slope angle than the main outer surfaces 15 of the deflecting rod 4. Particularly, the secondary actuating surfaces of the sliding displacement grooves 22 have a flatter or less steep slope angle relative to the rotation axis 20 in comparison to the slope angle of the main outer surfaces 15 of the deflecting rod 4. As a result, the lower sliding plate 6, which engages the sliding displacement grooves 22, is slidingly displaced a greater distance in both longitudinal directions 35 than the upper sliding plate 5, which engages the main outer surfaces 15 of the deflecting rod 4. Thus, in the longitudinal sliding directions 35, the bead deflector 7 and the following roller 9 carried by the lower sliding plate 6 will be displaced farther than the pressing roller 8 carried by the upper sliding plate 5. However, due to the angular spacings $\alpha$ and $\beta$ of the tools 7 and 9 away from the diameter line 19 corresponding to the sliding directions 35, the actual radial distance of the tools 7 and 9 from the rotation axis 20 will always substantially match the radial distance of the pressing roller 8 from the rotation axis 20. In this regard, "substantially" means to match sufficiently so that the tools 7, 8 and 9 are positioned within the acceptable range of the proper radial position in order to carry out their functions for mounting the tire without damaging the tire, the rim or the tools, and without causing any difficulties in carrying out the tire mounting procedure.

Since the angular spacings $\alpha$ and $\beta$ about the rotation axis 20 and relative to the diameter line 19 change from about 45° at an adjustment for 12 inch diameter wheels to approximately 20° at an adjustment for 25 inch diameter wheels, the adaptation of the sliding displacement distance in both longitudinal sliding directions 35 is not linear due to the varying trigonometric functions (resulting from the varying angles), so that the sloping actuating surfaces of the sliding displacement groove 22 would actually have to be somewhat curved to achieve a completely accurate and perfect match of the displacement positions. However, this non-linearity in view of the trigonometric functions is negligible in the practical adjustment range, so that the present embodiment of the sliding displacement groove 22 is carried out with linear sloping actuating surfaces thereof for simplicity. For example, a middle or average value of the radial path adaptation of approximately ±6% is provided with reference to a middle wheel diameter 17 of e.g. 17 inches. However, in that regard, the bead deflector 7 must always be slidingly displaced radially so far that it provides a 6% increase of the sliding displacement distance relative to 17 inch wheels also for large wheel diameters 18 of e.g. 25 inches, in order so as not to contact the wheel rim edge of the wheel rim flange. In these cases, due to the linear sloping actuating surfaces of the sliding displacement groove 22, a small lengthening of the radial displacement path of the pressing roller 8 is provided and accepted, as this small radial displacement increase still ensures a sufficient contact surface on the tire sidewall even for extreme low profile ratios down to 25%.

The exact values of this adaptation can be calculated through the use of trigonometric angle functions and can be used for dimensioning and producing the sloping actuating surfaces of the sliding displacement groove 22. Due to the angular adaptation despite the longitudinal sliding displacement of all tire mounting tools 7, 8 and 9 in one of the opposed longitudinal directions 35, the spacing distance of the mounting tools 7, 8 and 9 relative to the wheel rim essentially does not change for all wheel rim sizes 16, 17 and 18, so that the inventive mechanical adjusting arrangement on the mounting head 1 achieves a continuous step-less adjustment for all wheel rim sizes at least from 12 inches to at least 25 inches.

With such an adjustment linearly along or parallel to only one opposite radial longitudinal direction 35, however, the problem arises that thereby simultaneously the tangential angles of the mounting tools 7, 8 and 9 relative to the wheel rim circumference 16, 17 of 18 would change. This is avoided in that the inventive mounting apparatus carries out the sliding displacement of one of the mounting tools, i.e. the pressing roller 8, directly radially along the longitudinal direction 35, and simultaneously adjusts the two other mounting tools, i.e. the bead deflector 7 and the following roller 9, in a following guided manner corresponding to their respective angle adjustment $\Delta\alpha$ and $\Delta\beta$. Therefore, preferably the pressing roller wheel 21 of the pressing roller 8 is oriented perpendicularly to the radial sliding displacement in the longitudinal direction 35 and is secured symmetrically to the diameter line 19 on the upper sliding plate 5. Thereby the radial sliding displacement direction always extends radially through the rotation axis 20 of the mounting apparatus and the rotation point of the pressing roller wheel 21 of the pressing roller 8, so that the pressing roller wheel will always roll tangentially along the tire sidewall. Thus, the pressing roller 8 does not need any angular or tangential adjustment.

For adjusting the tangential angle of the bead deflector 7 to match the wheel rim circumference 16, 17 or 18 when the apparatus is adjusted, the adjusting arrangement further includes another part, namely a pivot arm or toggle lever 10 as an adjusting device. The pivot arm or toggle lever 10 is rigidly connected with a guide finger 23 of the bead deflector 7. The bead deflector 7 serves to ensure that the tire bead will run around the wheel rim flange radially outwardly of the wheel rim flange during the tire mounting process, so that the tire bead can then be pressed vertically downwardly into the wheel rim bed by the pressing roller 8 that follows after the bead deflector 7. The bead deflector 7 comprises an outwardly bent metal slide plate 24 to which the guide finger 23 is joined pointing in the rotation direction 34 in order to ensure a good radial guidance of the tire bead and to prevent a contact with the wheel rim outer surfaces even for wheel rims having outwardly protruding star spokes. In that regard, the guide finger 23 along with the metal slide plate 24 must always be oriented tangentially to the wheel rim circumference 16, 17 or 18, even when the deflector 7 is adjusted to different wheel rim diameters. This will always be ensured when the guide finger 23 is oriented perpendicularly to a line extending through its rotation point 25 and the rotation axis 20 of the vehicle wheel. Therefore, the pivot arm or toggle lever 10 is supported rotatably and longitudinally slidably at the rotation point of the rotation axis 20 in a slide bearing or guide member 26 serving as a pivot element as a part of the adjusting arrangement. Namely, the guide member 26 is pivotable about the rotation axis 20, and the toggle lever 10 is slidable in the guide member 26. Particularly, for that purpose the guide member 26 is pivotably secured at the rotation axis 20 on a connecting web or bracket 27.

In connection with a longitudinal sliding adjustment of the adjusting plates 5 and 6 in both longitudinal directions 35, the toggle lever 10 slides in a sliding groove in the guide member 26 corresponding to the sliding adjustment path distance, and thereby slidingly moves in the guide member 26 always along a radial line that extends through the rotation axis 20 and also through the pivot point 25 of the bead deflector 7. This ensures that the guide finger 23 will always be oriented perpendicular to this radial line extending through the rotation axis and will thus always be oriented tangential to the tire bead or the wheel rim circumference 16, 17 or 18. Therefore, the tire bead can be guided with the smallest possible friction over a large sliding surface by the pressing roller 8 over the wheel rim flange into the wheel rim bed.

The following roller 9 also needs to be angularly adjusted to remain tangential to the wheel rim circumference. The necessary associated tangential angle adjustment of the following roller 9 is achieved through a pivotable coupling of the following roller 9 with the pressing roller 8 by means of a pivot or swivel joint 28. In that regard the following roller arrangement 9 comprises a vertical tool shaft 29 that is secured at its upper end on the lower adjusting plate 6, and a following roller wheel 36 carried rotatably on the lower end of the tool shaft 29. Due to its connection with the lower adjusting plate 6, the following roller arrangement 9 is horizontally slidably adjustable in common with, and in the same longitudinal direction 35 as, the bead deflector 7. The following roller 9 is basically not absolutely necessary for carrying out a tire mounting process, especially for some tire types. Instead, the following roller 9 merely serves for the longer pressing-down and holding of the tire bead in the wheel rim cavity or bed, because the tire bead especially of an extremely low profile ratio tire otherwise could easily spring back up out of the wheel rim bed due to the stiff tire sidewall of such an extreme low profile ratio tire. Therefore, the vertical adjustment of the following roller 9 is coupled to that of the pressing roller 8, when such a following roller 9 is provided.

As mentioned above, the following roller wheel 36 is rotatably supported on the bottom working end of the tool shaft 29 of the following roller arrangement 9. The following roller wheel 36 is somewhat smaller in diameter than the pressing roller wheel 21 of the pressing roller 8, but runs or rolls around the tire sidewall approximately along the same circular path as the pressing roller wheel 21. Because this following roller wheel 36 shall also be oriented and run tangentially along the tire sidewall for all tire and wheel rim sizes, it is necessary to rotatably adjust the tangential angle of the following roller wheel 36 when it is slidingly adjusted in the longitudinal direction 35, similarly like for the bead deflector 7 as discussed above. To achieve this for the following roller wheel 36, the pivot or swivel joint 28 is arranged between the tool shaft 29 of the following roller 9 and the tool shaft of the pressing roller 8. The pivot or swivel joint 28 comprises a pivot arm 31 and a mounting or holding plate 32, which are connected with one another by a ball joint 33. The pivot arm 31 is secured to the tool shaft 29 of the following roller 9, and the holding plate 32 is secured on the tool shaft of the pressing roller 8. The tool shaft 29 of the following roller 9 is rotatably secured to the lower adjusting plate 6.

Also, the pivot point 25' of the tool shaft 29 is symmetrical to the pivot point 25 of the tool shaft of the bead deflector 7, namely at equal angles $\alpha$ and $\beta$ relative to the diameter line 19 passing through the pressing roller 8.

In connection with a radial sliding displacement of the pressing roller 8 and a parallel longitudinal sliding displacement of the following roller 9 along a different displacement distance as discussed above, therefore due to the pivot joint 28, the tool shaft 29 of the following roller 9 will be pivotally adjusted through an appropriate pivot angle so that the angular setting of the following roller wheel 36 will always be oriented tangentially to the wheel rim circumference 16, 17 or 18, even though the sliding adjustment thereof is not along a radial line but rather longitudinally parallel to the sliding displacement in the sliding direction 35 of the pressing roller 8. The following roller 9 is moved synchronously with the bead deflector 7 with respect to its longitudinal sliding direction and distance from the rotation axis 20. The pivot joint arrangement 28 accounts for the angular difference or change $\Delta\beta$ relative to the sliding displacement longitudinal direction 35 of the pressing roller 8, so that the following roller 9 will always be oriented to run at least approximately tangentially on at least approximately the same circular path as the pressing roller 8. Thereby, even for extremely low profile ratio tires, a sure and reliable rolling of the following roller 9 along the narrow tire sidewall will be ensured.

The above described tire mounting apparatus is provided for a clockwise rotational drive as shown by the rotation direction 34 as viewed from the top. The rotation direction dictates the order of the tire mounting tools 7, 8 and 9. Namely, the bead deflector 7 must be the first tool to come into contact and engagement with the tire bead or sidewall, followed by the pressing roller 8, and finally followed by the following roller 9. Thus, if the tire mounting apparatus is embodied for a counterclockwise rotation, then the mounting tools 7, 8 and 9 would be arranged in the opposite circumferential order. In another embodiment of the invention, the following roller 9 could be omitted, or alternatively if needed a second additional following roller or a comparable tire mounting tool could additionally be provided. It is also not necessary that the following roller 9 must be arranged symmetrically to the bead deflector 7 relative to the pressing roller 8 therebetween. Instead, the following roller 9 could be arranged with a larger or smaller angular spacing following after the pressing roller 8, in comparison to the angular spacing of the bead deflector leading before the pressing roller. In such a non-symmetrical arrangement, however, an additional adjusting plate would be necessary as a radial adjusting means. This additional (third) adjusting plate would have to be actuated by an adjustable sliding displacement groove of the deflecting rod 4 having a third different slope angle of its sloping actuating face to account for the different angular offset of the following roller 9 so that the sliding displacement of the following roller 9 would be correctly matched to the motion of the pressing roller 8 in consideration of the angular offset. Thus, each one of the mounting tools would be displaced by its own associated sliding plate for carrying out the adjustment.

In the illustrated and described example embodiment, the radial angle spacing $\alpha$ between the bead deflector 7 and the pressing roller 8 on average or for a middle wheel rim size of 17 inches amounts to about 30°, and in a large adjustment range for wheel rims or disks from 12 inches to 25 inches the angle $\alpha$ amounts to about 45° for a 12 inch wheel and amounts to only about 20° for a 25 inch wheel. Through such a sliding displacement along only one longitudinal direction 35 for all of the tools, angle dependent radial sliding displacement differences of about 20% arise, which must be compensated for in order to exactly adjust adapt the tire mounting apparatus to the various different wheel rim or disk diameters 16, 17 or 18 and profile ratios over the entire adjustment range. For that reason, it is advantageous to provide a middle or average angular spacing distance $\alpha$ between the bead deflector 7 and the pressing roller 8 of about 30°, because larger angular spacing distances would induce larger angular sliding displacement differences that must be compensated for, which would be possible by a corresponding change of the slope angle of the sliding displacement groove 22 of the deflecting rod 4, but this would require greater sliding displacement forces to be exerted on and by the deflecting rod 4.

In a different embodiment of the tire mounting apparatus according to the invention, the basic or reference sliding displacement direction along a radial line from the rotation axis 20 could be taken to be the longitudinal sliding displacement direction of the bead deflector 7 (rather than the pressing roller 8), and then the radial sliding displacement and tangential orientation of the pressing roller 8 and of the following roller 9 would have to be adjusted and matched angularly to the bead deflector 7 as the basic reference point.

In still another example embodiment of the tire mounting apparatus according to the invention, the individual mounting tools 7, 8 and 9 are individually adjustable in respective radial directions at proper angles by respective individual independent adjusting sliding plates, or by independently slidably displaceable toggle levers, so that the same radial adjustment path distances can always be simultaneously actuated for all of the tools. To achieve that, however, it is necessary to provide a respective separate individual deflecting rod as a deflecting element oriented at a proper respective angle for each adjusting plate or toggle lever that is to be adjustable in each adjustment direction. On the other hand, a tangential rotational guided adjustment of the rotation angle of the individual tool support shafts is not necessary and is thus omitted. As a further alternative, the three individual adjusting plates are actuated by a single common conical actuating element acting on all of the adjusting plates, instead of individual deflecting rods acting on the individual adjusting plates. This conical actuating element simultaneously achieves a deflection in several directions or on several sides with appropriate slope angles in each adjusting direction. Namely, the conical element can be a regular cone with a uniform slope angle all around for uniformly actuating the several sliding plates in the different radial directions thereof, or the conical element can have different slope angles on different sides thereof to achieve different radial sliding actuations of the several sliding plates.

Further particular embodiments of the invention are provided in an apparatus for mounting a tire onto a vehicle wheel rim, the apparatus comprising:

a rotatable drive shaft 2 extending along a shaft rotation axis 20 in an axial direction;
  a mounting head 1 secured on the drive shaft 2;
  an actuator rod 3 axially slidably arranged coaxially along the drive shaft 2;
  first and second slide plates 5, 6 carried slidably by the mounting head 1 to be slidable orthogonally to the axial direction;
  a deflecting element 4 that couples the actuator rod 3 separately to each one of the slide plates 5, 6 so as to be adapted to transmit an axial motion of the actuator rod 3 in the axial direction to mutually separate sliding motions of the slide plates 5, 6 orthogonal to the axial direction;
  first and second tire mounting tools including a tire bead deflector 7 adapted to deflect a tire bead of the tire to be mounted and a pressing roller 8 adapted to press a tire sidewall of the tire to be mounted, wherein the first tire mounting tool 7 or 8 is secured to the first slide plate and the second tire mounting tool 8 or 7 is secured to the second slide plate, and wherein the first tire mounting tool 7 or 8 is pivotable about a pivot axis parallel to the shaft rotation axis; and
  a pivot arm 10 or 31 with one end secured to the first tire mounting tool 7 or 8 and with another end connected to a pivot element 26 or 32 mounted at the shaft rotation axis 20 or on the second tire mounting tool 8 or 7, wherein the pivot arm 10 or 31 is adapted to pivot the first tire mounting tool about the pivot axis to a prescribed tangential pivot position as the first tire mounting tool is slidingly displaced with the first slide plate to a first tool radius about the shaft rotation axis and the second tire mounting tool is slidingly displaced with the second slide plate to a second tool radius about the shaft rotation axis to adjust to a wheel diameter of the vehicle wheel rim. p Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for mounting a tire onto a vehicle wheel rim, said apparatus comprising:
  a rotatable drive shaft extending along a shaft rotation axis in an axial direction;
  a mounting head secured on said drive shaft;
  an actuator rod axially slidably arranged coaxially along said drive shaft;
  first and second slide plates carried slidably by said mounting head to be slidable orthogonally to said axial direction;
  a deflecting element that couples said actuator rod separately to each one of said slide plates so as to be adapted to transmit an axial motion of said actuator rod in said axial direction to mutually separate sliding motions of said slide plates orthogonal to said axial direction;
  first and second tire mounting tools including a tire bead deflector adapted to deflect a tire bead of the tire to be mounted and a pressing roller adapted to press a tire sidewall of the tire to be mounted, wherein said first tire mounting tool is secured to said first slide plate and said second tire mounting tool is secured to said second slide plate, and wherein said first tire mounting tool is pivotable about a pivot axis parallel to said shaft rotation axis; and
  a pivot arm with one end secured to said first tire mounting tool and with another end connected to a pivot element mounted at said shaft rotation axis or on said second tire mounting tool, wherein said pivot arm is adapted to pivot said first tire mounting tool about said pivot axis to a prescribed tangential pivot position as said first tire mounting tool is slidingly displaced with said first slide plate to a first tool radius about said shaft rotation axis and said second tire mounting tool is slidingly displaced with said second slide plate to a second tool radius about said shaft rotation axis to adjust to a wheel diameter of the vehicle wheel rim.

2. An apparatus for mounting a tire onto a vehicle wheel rim, wherein said apparatus is adjustable to mount tires having respective different tire sizes on wheel rims having respective different wheel diameters within a range of different wheel diameters, said apparatus comprising:
  a rotatable drive shaft extending along a shaft rotation axis in an axial direction;
  a mounting head secured on an end of said drive shaft;
  tire mounting tools including a tire bead deflector and a tire pressing roller that are both carried by said mounting head; and
  a mechanical adjusting arrangement that is carried by said mounting head, and that is connected to said tire bead deflector, and that is connected to said tire pressing roller, and that is adapted to move said tire bead deflector and said tire pressing roller respectively along a plane orthogonal to said shaft rotation axis to respective radial positions adjusted to the wheel diameter of the vehicle wheel rim, and that is adapted to maintain a prescribed tangential angular position of said tire bead deflector and said tire pressing roller about said shaft rotation axis;

wherein said adjusting arrangement comprises a push rod that is axially slidably arranged coaxially in said drive shaft and extends with an end section thereof into said mounting head, and a deflecting rod that is connected to said end section and is configured and adapted to redirect an axial motion of said push rod in said axial direction into at least one lateral motion orthogonal to said axial direction;

wherein said adjusting arrangement further comprises two adjusting plates that are slidably carried by said mounting head to be slidable orthogonally to said axial direction, wherein each one of said adjusting plates respectively has an opening into which said deflecting rod respectively engages in a force-transmitting manner;

wherein said deflecting rod extends laterally and obliquely from said push rod at an oblique angle relative to said axial direction, and wherein said deflecting rod is slidingly fittingly received separately in each said opening of each one of said adjusting plates, and wherein said deflecting rod is arranged and configured to slidingly displace said adjusting plates with said lateral motion orthogonal to said axial direction when said push rod is moved with said axial motion in said axial direction.

3. The apparatus according to claim 2, wherein said deflecting rod has at least a first obliquely sloping actuating surface that extends at a first oblique slope angle relative to said axial direction and that slidingly bears against a first obliquely sloping counter surface in a first said opening in a first one of said adjusting plates to be engaged therein in a force-transmitting manner.

4. The apparatus according to claim 2, wherein said deflecting rod has obliquely sloping first and second actuating surfaces that respectively extend at different first and second oblique slope angles relative to said axial direction, said first actuating surface slidingly bears against a correspondingly obliquely sloping first counter surface in a first said opening of a first one of said adjusting plates, and said second actuating surface slidingly bears against a correspondingly obliquely sloping second counter surface in a second said opening of a second one of said adjusting plates.

5. The apparatus according to claim 4, wherein said first actuating surface is a main outer surface of said deflecting rod, said second actuating surface is a surface of a sliding displacement groove in or on said deflecting rod, and said two adjusting plates are both slidably displaceable only in two opposite longitudinal sliding directions.

6. The apparatus according to claim 2, wherein said adjusting plates are arranged parallel one on top of another and slidably displaceably supported in oppositely positioned guide slots in said mounting head, so that said adjusting plates are slidable in at least one longitudinal direction orthogonal to said axial direction.

7. The apparatus according to claim 2, wherein said apparatus is adjustable so as to be able to mount tires on wheel rims of all wheel diameters in said range which spans from a 12 inch wheel diameter to a 25 inch wheel diameter.

8. The apparatus according to claim 2, wherein said mounting head, said tire mounting tools, and said adjusting arrangement are all purely mechanical, and wherein said apparatus does not include any rotatable electrical, hydraulic or pneumatic connection to said mounting head or to said adjusting arrangement.

9. An apparatus for mounting a tire onto a vehicle wheel rim, wherein said apparatus is adjustable to mount tires having respective different tire sizes on wheel rims having respective different wheel diameters within a range of different wheel diameters, said apparatus comprising:
a rotatable drive shaft extending along a shaft rotation axis in an axial direction;
a mounting head secured on an end of said drive shaft;
tire mounting tools including a tire bead deflector, a tire pressing roller, and optionally a following press roller, which are carried by said mounting head; and
a mechanical adjusting arrangement that is carried by said mounting head, and that is connected to said tire bead deflector, and that is connected to said tire pressing roller, and that is adapted to move said tire bead deflector and said tire pressing roller respectively along a plane orthogonal to said shaft rotation axis to respective radial positions adjusted to the wheel diameter of the vehicle wheel rim, and that is adapted to maintain a prescribed tangential angular position of said tire bead deflector and said tire pressing roller about said shaft rotation axis;
wherein said adjusting arrangement comprises first and second radial adjusting elements that are both movable in the same two opposed radial longitudinal directions, said tire pressing roller is secured to said first radial adjusting element, said tire bead deflector is secured to said second radial adjusting element, a first one of said tire mounting tools is always positioned along a radial line extending along said longitudinal directions through said shaft rotation axis, said first tire mounting tool has a fixed tangential angular orientation perpendicular to said radial line, a second one of said tire mounting tools is slidingly adjustable in said longitudinal directions offset from and parallel to said radial line, said second tire mounting tool is pivotable about a second tool pivot axis parallel to said axial direction, and said adjusting arrangement further comprises a mechanical tangential adjusting mechanism that is connected to said second tire mounting tool and adapted to pivot said second tire mounting tool about said second tool pivot axis to maintain a tangential angular orientation of said second tire mounting tool about said shaft rotation axis.

10. The apparatus according to claim 9, wherein said tire mounting tools include said following press roller, which is slidingly adjustable in said longitudinal direction offset from and parallel to said radial line, said following press roller is pivotable about a third tool pivot axis parallel to said axial direction, and said adjusting arrangement further comprises another mechanical tangential adjusting mechanism that is connected to said following press roller and adapted to pivot said following press roller about said third tool pivot axis to maintain a tangential angular orientation of said following cress roller about said shaft rotation axis.

11. The apparatus according to claim 9, wherein said mechanical tangential adjusting mechanism comprises a toggle lever that is connected rigidly to said second tire mounting tool and that is supported pivotably and slidably in a slide bearing that is pivoted on said shaft rotation axis.

12. The apparatus according to claim 9, wherein said mechanical tangential adjusting mechanism comprises a pivot arm that is connected rigidly to said second tire mounting tool and that is connected pivotably to said first tire mounting tool.

* * * * *

UNITED STATES PATENT AND TRADEMARK OFFICE
CERTIFICATE OF CORRECTION

| | |
|---|---|
| PATENT NO. | : 7,604,035 B2 |
| APPLICATION NO. | : 11/980069 |
| DATED | : October 20, 2009 |
| INVENTOR(S) | : Werner Lehr et al. |

It is certified that error appears in the above-identified patent and that said Letters Patent is hereby corrected as shown below:

Column 12,
Line 54, after "adjust", insert --and--;

Column 14,
Line 6, after "rim", delete "p";
Line 6, after "rim", start a new paragraph;

Column 16,
Line 54, replace "cress", by --press--.

Signed and Sealed this

Thirtieth Day of November, 2010

David J. Kappos
*Director of the United States Patent and Trademark Office*